(12) United States Patent
Lassila et al.

(10) Patent No.: US 6,969,738 B2
(45) Date of Patent: *Nov. 29, 2005

(54) MALIC ACID DIESTER SURFACTANTS

(75) Inventors: Kevin Rodney Lassila, Macungie, PA (US); Caroline Sassano Slone, Quakertown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 712 days.

This patent is subject to a terminal disclaimer.

(21) Appl. No.: 10/043,841

(22) Filed: Jan. 9, 2002

(65) Prior Publication Data

US 2002/0103280 A1 Aug. 1, 2002

Related U.S. Application Data

(62) Division of application No. 09/427,317, filed on Oct. 26, 1999.

(51) Int. Cl.$^7$ ................................................ C08K 5/10
(52) U.S. Cl. ............. 524/310; 106/287.24; 106/287.26; 523/160; 523/161
(58) Field of Search ...................... 524/310; 106/287.24, 106/287.26; 523/160, 161

(56) References Cited

U.S. PATENT DOCUMENTS

| | | | |
|---|---|---|---|
| 2,122,716 A | 7/1938 | Graves | 260/106 |
| 2,925,352 A | 2/1960 | Lowe | 106/181 |
| 3,927,073 A | 12/1975 | Sundby | 260/485 G |
| 4,005,189 A | 1/1977 | Reese et al. | 424/47 |
| 5,098,478 A | 3/1992 | Krishnan et al. | 106/23 |
| 5,505,937 A | 4/1996 | Castrogiovanni et al. | 424/64 |
| 5,562,762 A | 10/1996 | Mrvos et al. | 106/22 H |
| 5,597,576 A | 1/1997 | Genova et al. | 424/401 |
| 5,695,679 A | 12/1997 | Christie et al. | 252/186.26 |
| 5,702,693 A | 12/1997 | Simmons | 424/78.03 |
| 5,904,917 A | 5/1999 | Mattai et al. | 424/59 |

FOREIGN PATENT DOCUMENTS

| | | |
|---|---|---|
| DE | 3011645 A1 | 10/1981 |
| DE | 19621681 | 4/1997 |
| EP | 0850935 A2 | 7/1998 |

OTHER PUBLICATIONS

Schwartz, J. "The Importance of Low Dynamic Surface Tension in Waterborne Coatings", Journal of Coatings Technology, Sep. 1992.

Wirth, W.; Storp, S.; Jacobsen, W. "Mechanisms Controlling Leaf Retention of Agricultural Spray Solutions", Pestic. Sci. 1991, 33, 411–420.

Medina, S.W.; Sutovich, M. N., "Using Surfactants to Formulate VOC Compliant Waterbased Inks", Am. Ink Maker 1994, 72 (2), 32–38.

Vaughan, C.D., and Rice, D. A., Dispersion Science and Technology, 1990, 11, 83.

Kyotani et al., Sekiyu Gakkaishi, 1988, 31 382.

*Primary Examiner*—Edward J. Cain
(74) *Attorney, Agent, or Firm*—Michael Leach

(57) ABSTRACT

This invention provides water-based compositions, particularly coating, ink, fountain solution, adhesive and agricultural compositions, manifesting reduced equilibrium and dynamic surface tension by the incorporation of a surface tension reducing amount of certain malate diester compounds of the structure

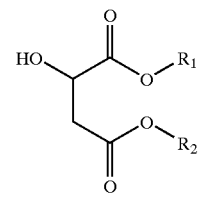

where $R_1$ and $R_2$ are C3 to C6 alkyl groups.

20 Claims, No Drawings

MALIC ACID DIESTER SURFACTANTS

This application is a Divisional of Ser. No. 09/427,317 filed Oct. 26, 1999.

FIELD OF THE INVENTION

The invention relates to the use of malic acid diesters to reduce the surface tension in water-based systems.

BACKGROUND OF THE INVENTION

The ability to reduce the surface tension of water is of great importance in waterborne coatings, inks, adhesives, fountain solutions and agricultural formulations because decreased surface tension translates to enhanced substrate wetting in actual formulations. Surface tension reduction in water-based systems is generally achieved through the addition of surfactants. Performance attributes resulting from the addition of surfactants include enhanced surface coverage, fewer defects, and more uniform distribution. Equilibrium surface tension performance is important when the system is at rest. However, the ability to reduce surface tension under dynamic conditions is of great importance in applications where high surface creation rates are utilized. Such applications include spraying, rolling and brushing of coatings or spraying of agricultural formulations, or high speed gravure or ink-jet printing. Dynamic surface tension is a fundamental quantity which provides a measure of the ability of a surfactant to reduce surface tension and provide wetting under such high speed application conditions.

Traditional nonionic surfactants such as alkylphenol or alcohol ethoxylates, and ethylene oxide (EO)/propylene oxide (PO) copolymers have excellent equilibrium surface tension performance but are generally characterized as having poor dynamic surface tension reduction. In contrast, certain anionic surfactants such as sodium dialkyl sulfosuccinates can provide good dynamic results, but these are very foamy and impart water sensitivity to the finished coating.

In addition to the development of high-performance surfactants, there is considerable interest in the industry in surfactants with improved environmental characteristics. Environmental concerns have led to an increased use of environmentally compatible surfactants as alternatives have become available. In addition, the use of less favorable products, such as alkylphenol ethoxylate (APE) surfactants, has declined. This is, in part, due to the poor environmental characteristics of APE surfactants, such as incomplete biodegradation and a suspicion that they may function as endocrine mimics. The demand for high-performance, eco-friendly surfactants has stimulated efforts in new surfactant development. From this work a new family of surfactants, referred to as alkyl polyglycoside (APG) surfactants, has emerged as a readily biodegradable, environmentally-friendly alternative to conventional surfactants. These materials, however, can be foamy and thus, are not suitable for a variety of coating, ink, adhesive and agricultural applications where the generation of foam is undesirable. Moreover, many APG surfactants possess poor color characteristics and are solids or pastes. This latter property complicates handling and necessitates the formation of blends which contain significantly less than 100% active ingredient. Thus, not only is it desirable to obtain surfactants which exhibit excellent surface tension reducing capabilities and low foam under dynamic application conditions, but it is also highly desirable that such new surfactants are environmentally-friendly, are liquids and possess little or no color.

There is a need for surfactants which exhibit good equilibrium and dynamic surface tension properties, are low-foaming, are low viscosity liquids to facilitate handling, have low color and low odor characteristics and would be widely accepted in the waterborne coating, ink, adhesive, fountain solution and agricultural formulation industries. Moreover, since there is substantial interest in the development of environmentally-friendly surfactants, an essential attribute would be that these surfactants not only possess the aforementioned desired performance attributes but also are derived from naturally occurring compounds or their synthetic equivalents or possess favorable biodegradation and toxicity properties.

The importance of reducing equilibrium and dynamic surface tension in applications such as coatings, inks, adhesives, fountain solutions and agricultural formulations is well-appreciated in the art.

Low dynamic surface tension is of great importance in the application of waterborne coatings. In an article, Schwartz, J. "*The Importance of Low Dynamic Surface Tension in Waterborne Coatings*", Journal of Coatings Technology, September 1992, there is a discussion of surface tension properties in waterborne coatings and a discussion of dynamic surface tension in such coatings. Equilibrium and dynamic surface tension were evaluated for several surface active agents. It is pointed out that low dynamic surface tension is an important factor in achieving superior film formation in waterborne coatings. Dynamic coating application methods require surfactants with low dynamic surface tensions in order to prevent defects such as retraction, craters, and foam.

Efficient application of agricultural products is also highly dependent on the dynamic surface tension properties of the formulation. In an article, Wirth, W.; Storp, S.; Jacobsen, W. "*Mechanisms Controlling Leaf Retention of Agricultural Spray Solutions*"; Pestic. Sci. 1991, 33, 411–420, the relationship between the dynamic surface tension of agricultural formulations and the ability of these formulations to be retained on a leaf was studied. These workers observed a good correlation between retention values and dynamic surface tension, with more effective retention of formulations exhibiting low dynamic surface tension.

Low dynamic surface tension is also important in high-speed printing as discussed in the article "*Using Surfactants to Formulate VOC Compliant Waterbased Inks*", Medina, S. W.; Sutovich, M. N. Am. Ink Maker 1994, 72 (2), 32–38. In this article, it is stated that equilibrium surface tensions (ESTs) are pertinent only to ink systems at rest. EST values, however, are not good indicators of performance in the dynamic, high speed printing environment under which the ink is used. Dynamic surface tension is a more appropriate property. This dynamic measurement is an indicator of the ability of the surfactant to migrate to a newly created ink/substrate interface to provide wetting during high speed printing.

U.S. Pat. No. 5,098,478 discloses water-based ink compositions comprising water, a pigment, a nonionic surfactant and a solubilizing agent for the nonionic surfactant. Dynamic surface tension in ink compositions for publication gravure printing must be reduced to a level of about 25 to 40 dynes/cm to assure that printability problems will not be encountered.

U.S. Pat. No. 5,562,762 discloses an aqueous jet ink of water, dissolved dyes and a tertiary amine having two polyethoxylate substituents and that low dynamic surface tension is important in ink jet printing.

A variety of esters of malic acid (2-hydroxy-butanedioic acid), also called malates, are known. Malic acid itself is used primarily as an additive in beverages, candy and food. The commercial form (DL-malic acid) is produced from maleic anhydride and is classified as GRAS (Generally Recognized As Safe) by the U.S. Food and Drug Administration. In addition, the naturally occurring form (L-malic acid) is found in many fruits at low concentrations.

DE 3 011 645 A1 discloses the use of mixed esters of hydroxycarboxylic acids as dispersion aids for the aqueous suspension polymerization of vinyl chloride.

U.S. Pat. No. 3,927,073 discloses esters of dicarboxylic acids with polyhydroxy tertiary amines as both a detergent and a fabric softening agent.

DE 19 621 681 A1 discloses aqueous pearl luster concentrates comprising esters of polyvalent carboxylic acids and/or hydroxycarboxylic acids with fatty alcohols in conjunction with emulsifiers and polyols. The mono- or di-esters of C6 to C22 alcohols were used to impart a pearl luster to "surface active agents" for use in hair shampoo and manual dishwashing detergents. Among the suggested acids is malic acid.

U.S. Pat. No. 5,695,679 discloses dishwashing detergent formulations comprising esters of mono- or polycarboxylic acids and mono- or polyhydric alcohols as "organic silver coating agents". Malic acid is listed among the carboxylic acids.

U.S. Pat. No. 2,925,352 discloses derivatives of malic acids as plasticisers for water-insoluble thermoplastic organic film-forming polymers. Example 4 shows a film-forming dope comprising 100 parts cellulose acetate, 12.5 parts of diisobutyl malate, 400 parts of dioxalane and 27 parts water.

U.S. Pat. No. 2,122,716 discloses hydroxycarboxylic acid esters of C10–C14 alcohols.

C. D. Vaughan and D. A. Rice, *J. Dispersion Science and Technology*, 1990, 11, 83, show the use of dioctylmalate in an oil-in-water emulsion used to test an equation for the "Required HLB" value for the oil phase in order to obtain a stable emulsion.

Kyotani et al, *Sekiyu Gakkaishi*, 1988, 31, 382, studied the effect of OH groups on the flow behavior of mono- and di-ester lubricants made from 2-ethylhexanol. The increased viscosity of di(2-ethylhexyl)malate versus di(2-ethylhexyl) succinate illustrates that the latter is a better lubricant. In this case, all liquids were studied neat and not in aqueous media.

U.S. Pat. No. 4,005,189 discloses as a deodorant an ester of an aliphatic mono- or dihydroxycarboxylic acid or an aliphatic mono- or dihydroxy-dicarboxylic acid having 2 to 4 carbons with an aliphatic alcohol having 1 to 6 carbons. Diethyl malate, diisopropyl malate and dihexyl malate are shown.

EP 0 850 935 A2 discloses concentrated solutions of 1,3,5-triazine derivatives and certain esters of carboxylic acids as solvents. A preferred solvent is bis(2-ethylhexyl) malate.

U.S. Pat. No. 5,505,937 discloses a transfer resistant cosmetic composition containing as a low viscosity oil dioctyl malate among the many listed esters.

U.S. Pat. No. 5,702,693 discloses an aqueous liquid composition for removal of gypsum from the skin of a patient comprising a water-miscible organic solvent, an acid and an emollient. The examples show dioctyl malate as an emollient.

U.S. Pat. No. 5,597,576 discloses oil-based transparent gels, i.e., "lipogels", containing malic acid diesters of C12–13 single-branch fatty alcohols.

SUMMARY OF THE INVENTION

This invention provides water-based compositions containing an organic or inorganic compound, particularly aqueous organic coating, ink, adhesive, fountain solution and agricultural compositions, having reduced equilibrium and dynamic surface tension by incorporation of an effective amount of a diester of malic acid of the following structure:

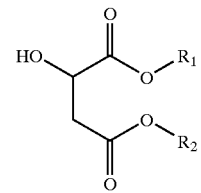

where $R_1$ and $R_2$ are C3 to C6 alkyl groups, but preferably $R_1$ and $R_2$ are the same. It is desirable that an aqueous solution of the malate diester demonstrates a dynamic surface tension of less than 45 dynes/cm at a concentration of $\leq 5$ wt % in water at 25° C. and 6 bubble/second according to the maximum-bubble pressure method. The maximum-bubble-pressure method of measuring surface tension is described in *Langmuir* 1986, 2, 428–432, which is incorporated by reference.

By "water-based", "aqueous" or "aqueous medium", we mean, for purposes of this invention, a solvent or liquid dispersing medium which comprises at least 90 wt %, preferably at least 95 wt %, water. Obviously, an all water medium is also included.

Also provided is a method for lowering the equilibrium and dynamic surface tension of such aqueous compositions by the incorporation of these malate diester compounds.

Also provided is a method for applying a coating of a water-based inorganic or organic compound-containing composition to a surface to partially or fully coat the surface with the water-based composition, the composition containing an effective amount of a malate diester compound of the above structure for reducing the dynamic surface tension of the water-based composition.

There are significant advantages associated with the use of these malate diesters in water-based organic coatings, inks, adhesives, fountain solutions and agricultural compositions and these advantages include:

water-borne coatings, inks, adhesives, fountain solutions and agricultural compositions which may be applied to a variety of substrates with excellent wetting of substrate surfaces including contaminated and low energy surfaces;

a reduction in coating or printing defects such as orange peel and flow/leveling deficiencies;

coating and ink compositions capable of high speed application;

low-foam surfactants capable of reducing dynamic surface tension;

low-foam surfactants which are low viscosity liquids at room temperature for facile handling;

low-foam surfactants which have low odor and color;

water-borne coatings and inks which have low volatile organic content, thus making these formulations environmentally favorable;

water-borne compositions using a surfactant derived from natural acids or synthetic equivalents, thus making such compositions environmentally favorable; and low-foam surfactants which exhibit good biodegradation characteristics and thus, are environmentally favorable.

Because of their excellent surfactant properties and the ability to control foam, these materials are likely to find use in many applications in which reduction in dynamic and equilibrium surface tension and low foam are important. Applications in which low foam is important include various wet-processing textile operations, such as dyeing of fibers, fiber souring, and kier boiling, where low-foaming properties would be particularly advantageous; they may also have applicability in soaps, water-based perfumes, shampoos, and various detergents where their marked ability to lower surface tension while simultaneously producing substantially no foam would be highly desirable.

DETAILED DESCRIPTION OF THE INVENTION

This invention relates to the use of compounds of the structure

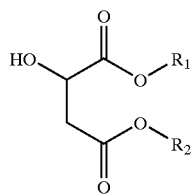

where $R_1$ and $R_2$ are independently a C3–C6 alkyl group, preferably $R_1=R_2$, for the reduction of equilibrium and dynamic surface tension in water-based compositions containing an organic compound, particularly coating, ink, fountain solution, adhesive and agricultural compositions containing organic compounds such as polymeric resins, herbicides, fungicides, insecticides or plant growth modifying agents. It is desirable that an aqueous solution of the malate diester demonstrates a dynamic surface tension of less than 45 dynes/cm at a concentration of ≦5 wt % in water at 25° C. and 6 bubble/second according to the maximum-bubble-pressure method. The maximum-bubble-pressure method of measuring surface tension is described in *Langmuir* 1986, 2, 428–432, which is incorporated by reference.

In one aspect of the invention the malate diesters of the above formula display excellent ability to reduce equilibrium and dynamic surface tension while producing substantially no foam.

These materials may be prepared by esterification of malic acid with an alcohol. The reaction is illustrated below:

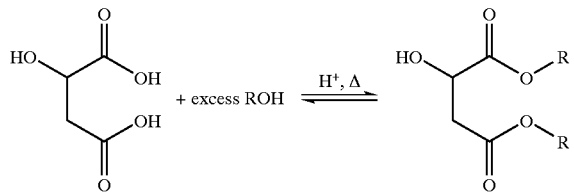

For the purpose of this invention all stereoisomers of malic acid are suitable, including L-malic acid, D-malic acid and DL-malic acid.

The esterification reaction may be performed using many catalysts and processes as described in the *Kirk-Othmer Encyclopedia of Chemical Technology*, 4th Ed., Vol. 9, p. 755–780, which is incorporated by reference. The reaction is preferentially catalyzed by an acid. Examples of suitable acid catalysts are acidic ion exchange resins (i.e. Amberlyst®15 resin), p-toluenesulfonic acid, boron trifluoride etherate and mineral acid catalysts, such as hydrochloric acid and sulfuric acid. In addition, the esterification reaction may be driven by removal of the water by-product. In this case, the water may be removed as an azeotrope, typically with the alcohol used in the reaction. Other suitable methods to remove water include the use of a drying agent. Also, solvents may be added to the reaction to aid the dissolution of malic acid or to facilitate azeotropic removal of water.

All alcohols or mixtures of alcohols containing the requisite C3 to C6 alkyl substituents may be utilized for the preparation of the dialkylmalates of this invention with alcohols containing a 3–5 carbons being preferred and those containing 4 carbons being especially preferred. Alkyl groups which are suitable should have sufficient carbon to confer surface activity (i.e. an ability to reduce the surface tension of water) to the material but not enough carbon to decrease the solubility to the extent that the ability of the material to reduce surface tension is insufficient for a particular application. In general, an increase in the carbon number increases the efficiency of the resulting dialkylmalate (i.e. less surfactant is required to obtain a given decrease in surface tension), but decreases its ability to reduce surface tension at high surface creation rates. The latter effect is a result of the fact that increased carbon number generally decreases the water solubility of the material, and consequently, diminishes the diffusive flux of surfactant to newly-created surface. Generally, in the practice of this invention, it is desirable to choose alkyl groups such that the resulting dialkylmalates have a solubility limit in water from 0.005 to 5 wt %, preferably from 0.01 to 3 wt %, and most preferably from 0.1 to 1.0 wt %.

The alkyl groups in the malates of this invention may be the same or different. However, symmetrical malates are preferred due to ease in synthesis. Alkyl groups may be linear or branched, with alkyl groups containing terminal branching being preferred. The point of attachment to the oxygen may be on either an internal or terminal carbon, with a terminal carbon being preferred. The total number of carbons on $R_1$ and $R_2$ should be ≧6; fewer than this diminishes the surface activity of the dialkylmalate too greatly. The total number of carbons should be ≦12; a greater number decreases the solubility of the material to such a degree that its use in many formulations is impractical. Examples of suitable alkyl groups are n-propyl, isopropyl, n-butyl, isobutyl, sec-butyl, n-pentyl, 2-pentyl, 3-pentyl, isopentyl, neopentyl, cyclopentyl, 2-methylbutyl, 3-methyl-2-butyl, n-hexyl, 2-hexyl, 3-hexyl, cyclohexyl, 2-ethylbutyl, 4-methyl-2-pentyl and so on. Preferred derivatives are those in which $R_1=R_2$ and contain a total of 6 to 12 alkyl carbons. Of these derivatives those which contain 6 to 10 alkyl carbons are preferred and those containing 8 to 10 alkyl carbons especially preferred, with those containing 8 alkyl carbons being the most preferred, especially in the case where $R_1=R_2=$isobutyl. Moreover, those alkyl groups which contain terminal branching or attachment at terminal oxygen are preferred.

An amount of dialkylmalate compound that is effective to reduce the equilibrium and/or dynamic surface tension of the water-based, organic compound-containing composition is added. Such effective amount may range from 0.001 to 20 wt %, preferably 0.01 to 10 wt %, and most preferably 0.05 to 5 wt %, of the aqueous composition. Naturally, the most effective amount will depend on the particular application and the solubility of the dialkylmalate.

The malate diesters are suitable for use in an aqueous composition comprising in water an inorganic compound which is a mineral ore or a pigment or an organic compound which is a pigment, a polymerizable monomer, such as addition, condensation and vinyl monomers, an oligomeric resin, a polymeric resin, a detergent, a caustic cleaning agent, a herbicide, a fungicide, an insecticide, or a plant growth modifying agent.

In the following water-based organic coating, ink, adhesive, fountain solution and agricultural compositions containing a dialkylmalate according to the invention, the other listed components of such compositions are those materials well known to the workers in the relevant art.

A typical water-based protective or decorative organic coating composition to which the malate diester surfactants of the invention may be added would comprise in an aqueous medium 30 to 80 wt % of a coating composition containing the following components:

| Water-Based Organic Coating Composition | |
| --- | --- |
| 0 to 50 wt % | Pigment Dispersant/Grind Resin |
| 0 to 80 wt % | Coloring Pigments/Extender Pigments/Anti-Corrosive Pigments/Other Pigment Types |
| 5 to 99.9 wt % | Water-Borne/Water-Dispersible/Water-Soluble Resins |
| 0 to 30 wt % | Slip Additives/Antimicrobials/Processing Aids/Defoamers |
| 0 to 50 wt % | Coalescing or Other Solvent |
| 0.01 to 10 wt % | Surfactant/Wetting Agent/Flow and Leveling Agents |
| 0.01 to 5 wt % | Dialkylmalate |

A typical water-based ink composition to which the malate diester surfactants of the invention may be added would comprise in an aqueous medium 20 to 60 wt % of an ink composition containing the following components:

| Water-Based Ink Composition | |
| --- | --- |
| 1 to 50 wt % | Pigment |
| 0 to 50 wt % | Pigment Dispersant/Grind Resin |
| 0 to 50 wt % | Clay base in appropriate resin solution vehicle |
| 5 to 99.9 wt % | Water-Borne/Water-Dispersible/Water-Soluble Resins |
| 0 to 30 wt % | Coalescing or Other Solvent |
| 0.01 to 10 wt % | Surfactant/Wetting Agent |
| 0.01 to 10 wt % | Processing Aids/Defoamers/Solubilizing Agents |
| 0.01 to 5 wt % | Dialkylmalate |

A typical water-based agricultural composition to which the malate diester surfactants of the invention may be added would comprise in an aqueous medium 0.1 to 80 wt % of an agricultural composition containing the following components:

| Water-Based Agricultural Composition | |
| --- | --- |
| 0.1 to 50 wt % | Pesticide, Insecticide, Herbicide or Plant Growth Modifying Agent |
| 0.01 to 10 wt % | Surfactant |
| 0 to 5 wt % | Dyes |
| 0 to 20 wt % | Thickeners/Stabilizers/Co-Surfactants/Gel Inhibitors/Defoamers |
| 0 to 25 wt % | Antifreeze |
| 0.01 to 50 wt % | Dialkylmalate |

A typical water-based fountain solution composition would the following components:

| Water-Based Fountain Solution | |
| --- | --- |
| 0.05 to 10 wt % | Film formable, water soluble macromolecule |
| 1 to 25 wt % | Alcohol, glycol, or polyol with 2–12 carbon atoms, water soluble or can be made to be water soluble |
| 0.01 to 20 wt % | Water soluble organic acid, inorganic acid, or a salt thereof |
| 30 to 70 wt % | Water |
| 0.01 to 5 wt % | Dialkylmalate |

A typical water-based adhesive composition to which the dialkylmalate surfactants of the invention may be added would comprise in an aqueous medium 30 to 65 wt % of an adhesive composition containing the following components:

| Water-Based Adhesive | |
| --- | --- |
| 50 to 99 wt % | Polymeric Resin (SBR, VAE, Acrylic) |
| 0 to 50 wt % | Tackifier |
| 0 to 0.5 wt % | Defoamer |
| 0.5 to 2 wt % | Dialkylmalate |

With the exception of diisopropyl-(S)-(−)-malate and dibutyl-DL-malate, which were available commercially, all malates in the following examples were synthesized and characterized via Gas Chromatography/Mass Spectrometry (GC/MS) and Nuclear Magnetic Resonance (NMR) spectroscopy. All dialkylmalates prepared ranged from >96% to >99% pure.

EXAMPLE 1

Diisopropyl-(S)-(−)-malate was purchased from Aldrich Chemical Company (99%) and used as received. The compound was a low viscosity, clear, colorless liquid with no detectable odor.

EXAMPLE 2

Dibutyl-DL-malate was purchased from TCI America (99%) and used as received. The compound was a low viscosity, clear, colorless liquid with a slight, pleasant odor.

EXAMPLE 3

Diisobutyl-DL-malate was prepared by esterification of DL-malic acid with isobutyl alcohol. To a three-neck 1 L round-bottomed flask equipped with a reflux condenser, Dean-Stark trap, septum, thermocouple and mechanical stirrer, were added DL-malic acid (75.91 g), 2-methyl-1-propanol (210 mL) and Amberlyst®15 ion exchange resin (10 g). The mixture was placed under nitrogen and heated to reflux. At 106° C., two phases started to collect in the Dean-Stark trap. The reaction temperature was maintained at 108° C. for 2 hr 15 min and the water was continuously removed via the Dean-Stark trap. As collection in the Dean-Stark trap slowed, the reaction temperature was increased to 115° C. and fresh alcohol (50 mL) was added to the reaction. The reaction was heated to 120° C. and more alcohol (50 mL) was added. At this point, no more water collected in the Dean-Stark trap. The product was separated from the catalyst via filtration. The crude yellow liquid was purified via vacuum distillation. Diisobutyl-DL-malate was obtained as a low viscosity, clear, colorless liquid with a slight pleasant odor (120.4 g, 86.3% yield).

EXAMPLE 4

Di-sec-butyl-DL-malate was prepared using a procedure similar to Example 3. This compound was isolated as a bottoms product. To the reaction flask, DL-malic acid (80.23 g), 2-butanol (220 mL) and Amberlyst®15 ion exchange resin (11.2 g) were added. The mixture was placed under nitrogen and heated to reflux. At 102° C., one phase started to collect in the Dean-Stark trap. The reaction was maintained at 102° C. for 4 hr. During this time, the water/alcohol azeotrope was removed as fresh alcohol was added. The product was dissolved in diethyl ether, separated from the catalyst via filtration over a bed of silica, washed with saturated sodium bicarbonate a number of times, washed once with water, and dried over magnesium sulfate. Diethyl ether was removed via rotary evaporation. Di-sec-butyl-DL-malate was obtained as a low viscosity, clear light yellow liquid with no detectable odor (46 g, 31% yield) after pumping on the sample in vacuo to remove residual 2-butanol.

EXAMPLE 5

Dipentyl-DL-malate was prepared using a procedure similar to that in Example 4. To the reaction flask, DL-malic acid (100.43 g), 1-pentanol (325 mL) and Amberlyst®15 ion exchange resin (14.2 g) were added. The mixture was placed under nitrogen and heated to reflux. At 108° C., two phases started to collect in the Dean-Stark trap. The reaction was maintained at 110–120° C. for 4 hr 15 min and water was continuously removed. The product was separated from the catalyst via filtration over silica using 300 mL diethyl ether. The organic layer was washed 4 times with saturated sodium bicarbonate, washed once with water, and dried over magnesium sulfate. Diethyl ether was removed via rotary evaporation. Dipentyl-DL-malate was obtained as a low viscosity, slightly hazy, very light yellow liquid with a slight pleasant odor (116.5 g, 55.6% yield) after pumping on the sample in vacuo to remove residual 1-pentanol.

EXAMPLE 6

Diisoamyl-DL-malate was prepared using a procedure similar to that in Example 4. To the reaction flask, DL-malic acid (87.54 g), 3-methyl-1-butanol (285 mL) and Amberlyst®15 ion exchange resin (11.9 g) were added. The mixture was placed under nitrogen and heated to reflux. At 109° C., two phases started to collect in the Dean-Stark trap. The reaction was maintained at 110° C. for 8 hr, during this time water was continuously removed. The product was dissolved in diethyl ether and separated from the catalyst via filtration over a bed of silica. The organic layer was washed with saturated sodium bicarbonate a number of times, washed once with water, and dried over magnesium sulfate. Diethyl ether was removed via rotary evaporation. Diisoamyl-DL-malate was obtained as a low viscosity, clear colorless liquid with a slight odor (130 g, 72% yield) after pumping on the sample in vacuo to remove residual 3-methyl-1-butanol.

EXAMPLE 7

Di(2-methylbutyl)-DL-malate was prepared using a procedure similar to that in Example 4. To the reaction flask, DL-malic acid (100.56 g), 2-methyl-1-butanol (325 mL) and Amberlyst®15 ion exchange resin (15.1 g) were added. The mixture was placed under nitrogen and heated to reflux. At 108° C., two phases started to collect in the Dean-Stark trap. After 1.5 hr, the reaction temperature was increased to 115° C. for 20 minutes and 120° C. for 20 minutes. Once water ceased to collect in the Dean-Stark trap, the product was diluted with diethyl ether, collected via filtration over a short bed of silica, washed 4 times with saturated sodium bicarbonate, once with water and dried over magnesium sulfate. The diethyl ether was removed via rotary evaporation. Di-(2-methylbutyl)-DL-malate was obtained as a low viscosity, clear, very light yellow liquid with no detectable odor (139.8 g, 68% yield) after removing residual 2-methyl-1-butanol via vacuum distillation.

EXAMPLE 8

Dihexyl-DL-malate was prepared using a procedure similar to that in Example 4 with p-toluenesulfonic acid as the catalyst. Unlike Examples 3–7, the reaction was not performed in neat alcohol. In this case, 1,4-dioxane was added to dissolve the starting acid. To the reaction flask, DL-malic acid (80.91 g), hexyl alcohol (307 mL), 1,4-dioxane (200 mL) and p-toluenesulfonic acid (12.3 g) were added. The mixture was placed under nitrogen and heated to reflux. At 103° C., one phase started to collect in the Dean-Stark trap. The reaction temperature was increased to 110° C. and after 2 hr 40 min very little liquid had collected in the trap. The reaction temperature was increased to 115° C. and held until no more liquid collected in the trap. The product was neutralized with saturated sodium bicarbonate, diluted with diethyl ether, washed three times with saturated sodium bicarbonate, once with water and dried over magnesium sulfate. The diethyl ether was removed via rotary evaporation. Dihexyl-DL-malate was obtained as a low viscosity, clear, colorless liquid with a slight pleasant odor (127.7 g, 70% yield) after removing residual hexyl alcohol via vacuum distillation.

EXAMPLE 9

Di(4-methyl-2-pentyl)-DL-malate was prepared using a procedure similar to that in Example 8. To the reaction flask, DL-malic acid (90.76 g), 4-methyl-2-pentanol (350 mL), 1,4-dioxane (200 mL) and p-toluenesulfonic acid (15.2 g) were added. The mixture was placed under nitrogen and heated to reflux. At 105° C., one phase started to collect in the Dean-Stark trap. After 2 hr, the temperature was increased to 110° C. After 1 hr 10 min, the temperature was increased to 112° C. and held until no more liquid collected in the trap. The reaction product was neutralized with saturated sodium bicarbonate, diluted with diethyl ether, washed three times with saturated sodium bicarbonate, once with water and dried over magnesium sulfate. The diethyl ether was removed via rotary evaporation. Di(4-methyl-2-pentyl)-DL-malate was obtained as a low viscosity, light yellow, slightly hazy liquid with no detectable odor (166.8 g, 81.5% yield) after removing residual 4-methyl-2-pentanol via vacuum distillation.

EXAMPLE 10

Dibenzyl-DL-malate was prepared using the method of Lee et al, *J. Chem. Soc. Perkin Trans. I*, 1995, 2877. To a three-neck 1 L round-bottomed flask equipped with a reflux condenser, Dean-Stark trap, thermocouple and mechanical stirrer, were added DL-malic acid (81.96 g), benzyl alcohol (132.0 g), toluene (620 mL) and p-toluenesulfonic acid (1.165 g). The mixture was placed under nitrogen and heated to reflux. At 100° C., two phases started to collect in the Dean-Stark trap. After 2 hr, the reaction temperature was increased to 105° C. for 1.5 hr. The crude product was neutralized with saturated sodium bicarbonate and poured into a separatory funnel. The organic layer was washed with saturated sodium bicarbonate twice, washed once with water, and dried over magnesium sulfate. The toluene was removed via rotary evaporation. Two-thirds of the crude product were purified via column chromatography (20% ethyl acetate in hexane eluent). Residual benzyl alcohol was removed via vacuum distillation to give a low viscosity, clear, colorless oil with no detectable odor (49.9 g, 28% yield).

In the following Examples dynamic surface tension data were obtained for aqueous solutions of various compounds using the maximum bubble pressure method at bubble rates from 0.1 bubbles/second (b/s) to 20 b/s. These data provide information about the performance of a surfactant at conditions from near-equilibrium (0.1 b/s) through extremely high surface creation rates (20 b/s). In practical terms, high bubble rates correspond to high printing speeds in lithographic printing, high spray or roller velocities in coating applications, and rapid application rates for agricultural products.

EXAMPLES 11–20

Solutions of the materials of Examples 1–10 in distilled water were prepared. Their dynamic surface tension was evaluated at 25° C. as described above, and these data were used to determine the quantities provided in the Table 1. The $pC_{20}$ value is defined as the negative logarithm of the molar concentration of surfactant required to decrease the surface tension of an aqueous solution to 52.1 dyne/cm, that is, 20 dyne/cm below that of pure water when the measurement is performed at 0.1 b/s. This value is a measure of the efficiency of a surfactant. In general, an increase in $pC_{20}$ value of 1.0 indicates that 10 times less surfactant will be required to observe a given effect. In addition, the relative efficiency of surfactants can be obtained by comparing surface tension reduction of solutions containing the same amount of different surfactants. Such data is given for 0.1 wt % solutions of the dialkylmalates at 1.0 and 6.0 bubbles/second (b/s). The solubility limit was determined by intersection of the linear portion of a surface tension/ln concentration curve with the limiting surface tension as is described in many textbooks. The limiting surface tensions at 0.1, 1, 6 and 20 b/s represent the lowest surface tensions in water which can be achieved at the given surface creation rates for a given surfactant regardless of the amount of surfactant used and is used to evaluate the effectiveness of a surfactant. These values give information about the relative ability of a surfactant to reduce surface defects under near-equilibrium conditions (0.1 b/s) through very dynamic conditions (20 b/s). Lower surface tensions would allow the elimination of defects upon application of a formulation onto lower energy surfaces.

TABLE 1

Surface Tension Data for Dialkylmalates

| | Structure | solubility limit[a] | $pC_{20}$ | limiting $\gamma$[b] | | | | $\gamma$(0.1 wt % solution)[c] | |
|---|---|---|---|---|---|---|---|---|---|
| | | | | (0.1 b/s) | (1 b/s) | (6 b/s) | (20 b/s) | (1 b/s) | (6 b/s) |
| Example 11 (Example 1) | | 5 | 1.83 | 33.6 | 33.8 | 34.0 | 35.3 | 59.2 | 60.1 |
| Example 12 (Example 2) | | 0.3 | 3.04 | 35.8 | 36.0 | 36.5 | 38.6 | 43.8 | 44.8 |
| Example 13 (Example 3) | | 0.4 | 3.08 | 33.5 | 33.3 | 33.4 | 35.3 | 44.1 | 45.2 |

TABLE 1-continued

Surface Tension Data for Dialkylmalates

| | Structure | solubility limit[a] | $pC_{20}$ | limiting γ[b] | | | | γ(0.1 wt % solution)[c] | |
|---|---|---|---|---|---|---|---|---|---|
| | | | | (0.1 b/s) | (1 b/s) | (6 b/s) | (20 b/s) | (1 b/s) | (6 b/s) |
| Example 14 (Example 4) | | 0.6 | 2.77 | 36.5 | 36.7 | 37.3 | 38.1 | 47.8 | 48.5 |
| Example 15 (Example 5) | | 0.03 | 3.52 | 36.8 | 38.2 | 40.5 | 50.1 | 38.2 | 40.5 |
| Example 16 (Example 6) | | 0.04 | 3.86 | 35.6 | 36.8 | 39.5 | 48.0 | 36.8 | 39.5 |
| Example 17 (Example 7) | | 0.04 | 3.47 | 37.8 | 38.9 | 41.2 | 49.7 | 38.9 | 41.2 |
| Example 18 (Example 8) | | 0.005 | 3.25 | 55.6 | 65.2 | 69.3 | 71.2 | 58.8 | 52.0 |
| Example 19 (Example 9) | | 0.02 | 3.84 | 40.8 | 50.9 | 63.9 | 69.4 | 46.2 | 56.4 |
| Example 20 (Example 10) | | 0.08 | 2.23 | 54.0 | 57.7 | 60.3 | 70.0 | 61.5 | 65.2 |

[a]Weight %
[b]Dyne/cm
[c]Limiting γ at 0.1 wt. % surfactant. At 0.5 wt. % dihexyl-DL-malate and above a cloudy, 2-phase mixture was observed with a limiting γ of 38.9 dyne/cm (0.1 b/s), 40.5 dyne/cm (1 b/s), 41.1 dyne/cm (6.0 b/s) and 44.9 dyne/cm (20 b/s).

The data in Table 1 illustrate that various dialkylmalates have the ability to reduce the surface tension of an aqueous composition and that in many cases low surface tension can be maintained even under conditions in which surface is created at a rapid rate. Examples 11–20 demonstrate that dialkylmalates containing alkyl groups of three to six carbon atoms exhibit surface tension values of less than 45 dyne/cm at a concentration of ≦5 wt % in water at 25° C. and at 0.1 b/s. Furthermore, dialkylmalates containing alkyl groups with three to five carbon atoms demonstrate a reduction in the dynamic surface tension of aqueous solutions of less than 45 dyne/cm under more dynamic conditions (6 b/s) and at a concentration of ≦5 wt % in water at 25° C. In comparison, C6 and greater dialkylmalates performed poorly under these conditions. Moreover, dialkylmalates containing alkyl groups with four to five carbon atoms can achieve dynamic surface tension reduction of aqueous compositions of less than 42 dyne/cm at 6 b/s at a concentration of <1 wt % surfactant. Surprisingly, dialkylmalates which contain C4 groups exhibit an optimum combination of effectiveness and efficiency with surface tension reduction of less than 40 dyne/cm at very fast surface creation rates (20 b/s) at a concentration of <1 wt % surfactant. Of the C4 dialkylmalates, those prepared from primary alcohols are preferred, with those containing terminal branching being the most preferred.

Overall, dialkylmalates containing C3 to C5 alkyl groups exhibit limiting dynamic surface tension values <38 dyne/cm at low surface creation rates (0.1 b/s) and values <50 dyne/cm at high surface creation rates (20 b/s). Specifically, dipentyl-DL-malate, diisoamyl-DL-malate and di(2-methylbutyl)-DL-malate are very efficient at reducing dynamic surface tension. This characteristic is evidenced by $pC_{20}$ values for these compounds of 3.52, 3.86 and 3.47, respectively. Moreover, the high efficiency of dipentyl-DL-malate, diisoamyl-DL-malate and di(2-methylbutyl)-DL-malate is evidenced by the surface tension data for 0.1 wt % compositions of these surfactants which are capable of maintaining a surface tension <42 dyne/cm at relatively high surface creation rates (6 b/s). In contrast, diisopropyl-(S)-(−)-malate is a very effective, but not very efficient surfactant. Although diisopropyl-(S)-(−)-malate is capable of maintaining a surface tension <34 dyne/cm at very fast rates (20 b/s), 5 wt % surfactant is required to reduce the surface tension to a similar value obtained for 0.1 to 0.5 wt % compositions of C4 dialkylmalates (Examples 12–14) and 0.05 to 0.1 wt % solutions of C5 dialkylmalates (Examples 15–17). In contrast, C4 dialkylmalates provide sufficient effectiveness (i.e. reduction in dynamic surface tension) with reasonable efficiencies (i.e. use levels). For example, diisobutyl-DL-malate can maintain a limiting surface tension less than 36 dyne/cm even at the highest surface creation rates measured (20 b/s). Moreover, this value covers a narrow surface tension range for all bubble rates and is for a 0.5 wt % solution. Thus, the C4 alkyl groups have optimum carbon to confer sufficient surface activity (i.e. efficiency) to the material but not enough carbon to decrease the solubility to the extent that the ability of the material to reduce surface tension is insufficient for a particular application (i.e. effectiveness).

In addition to the number of carbon atoms in the alkyl chain, the structure of the alkyl chain was observed to have an unanticipated effect on the properties of the malic acid diester surfactants of this invention. Particularly, branching at the end of the alkyl chain was found to improve both the efficiency and effectiveness of the dialkylmalate surfactant whereas, the attachment of an oxygen atom at an internal position on the alkyl group had a negative effect on surfactant performance. For example, the terminal branching present in diisobutyl-DL-malate accounts for a decrease in the limiting surface tension of 3.3 dyne/cm at 20 b/s when compared to dibutyl-DL-malate. In addition, the highest surface tensions exhibited for aqueous compositions containing 0.1 wt % of a C4 dialkylmalate were observed for di-sec-butyl-DL-malate, which was prepared from a secondary alcohol. Such differences in the performance of dialkylmalates containing the same number of carbon atoms would not be expected from what is known in the art. Thus, for dialkylmalates consistent with this invention, those with alkyl groups containing oxygen atoms attached at a terminal position are particularly applicable, with those containing terminal branching being preferred and with isobutyl groups being the most preferred for the reduction of surface tension of water in water-based, organic compound containing compositions, including waterborne coatings, inks, adhesives, fountain solutions and agricultural formulations. However, ultimately the choice of dialkylmalate will depend upon the application.

EXAMPLES 21–30

The foaming properties of 0.1 wt % solutions of the dialkylmalate surfactants of this invention were examined using a procedure based upon ASTM D 1173–53. In this test, a 0.1 wt % solution of the surfactant is added from an elevated foam pipette to a foam receiver containing the same solution. The foam height is measured at the completion of the addition ("Initial Foam Height") and the time required for the foam to dissipate at the air-liquid interface ("Time to 0 Foam") is recorded. This test provides a comparison between the foaming characteristics of various surfactant solutions. In general, in coatings, inks, adhesives, fountain solutions and agricultural compositions, foam is undesirable because it complicates handling and can lead to coating and print defects, and to inefficient application of agricultural materials. The data are presented in Table 2.

TABLE 2

Foam Test

| | Structure | initial foam (cm) | time to zero foam |
|---|---|---|---|
| Example 21 (Example 1) | [diisopropyl malate structure] | 1.3 | 14 sec |

TABLE 2-continued

Foam Test

| | Structure | initial foam (cm) | time to zero foam |
|---|---|---|---|
| Example 22 (Example 2) | dibutyl 2-hydroxysuccinate | 0.9 | 20 sec |
| Example 23 (Example 3) | bis(3-methylbutyl) 2-hydroxysuccinate | 0.6 | 0.2 sec |
| Example 24 (Example 4) | di-sec-butyl 2-hydroxysuccinate | 1.0 | 1 min |
| Example 25 (Example 5) | dipentyl 2-hydroxysuccinate | 0.5 | 0.2 sec |
| Example 26 (Example 6) | bis(3-methylbutyl) 2-hydroxysuccinate | 0.3 | 0.3 sec |
| Example 27 (Example 7) | bis(2-methylbutyl) 2-hydroxysuccinate | 1.2 | 0.1 sec |
| Example 28 (Example 8) | dihexyl 2-hydroxysuccinate | 0.5 | 0.1 sec |

TABLE 2-continued

Foam Test

| | Structure | initial foam (cm) | time to zero foam |
|---|---|---|---|
| Example 29 (Example 9) | [structure: diisoamyl malate] | 0 | 0 sec |
| Example 30 (Example 10) | [structure: dibenzyl malate] | 0 | 0 sec |

As illustrated, the ability to control foam is advantageous in many applications, including coatings, inks, adhesives, fountain solutions, agricultural formulations, soaps, detergents, food processing and so on. The results for the malate diesters are reported in Table 2. A drawback to the use of conventional surfactants in coatings, inks, adhesives, fountain solutions and agricultural compositions is the formation of considerable quantities of long-lasting foam in these systems. For such applications, it is desired that a surfactant forms little foam and that the foam which forms dissipates quickly. The data in Table 2 show that the compounds of this invention form very little foam or no measurable foam, and that the foam which forms dissipates quickly. Moreover, all of these materials form less initial foam and many form faster breaking foam than the current art. Surprisingly, linear alkyl groups and those which were prepared from secondary alcohols produced more initial foam and longer lasting foam than their counterparts which contain the same number of carbon atoms and alkyl groups with terminal branching. Therefore, malic acid diester surfactants which contain terminal branching are preferred as low-foaming surfactants, especially diisobutyl-DL-malate and diisoamyl-DL-malate. Overall, in addition to their ability to reduce the surface tension of organic-containing aqueous compositions, these materials have desirable foam properties with respect to their use in coatings, inks, adhesives, fountain solutions and agricultural compositions.

EXAMPLES 31–41

The ultimate biodegradability of various dialkylmalates (diisopropyl-(S)-(−)-malate, dibutyl-DL-malate, diisobutyl-DL-malate, di-sec-butyl-DL-malate, dipentyl-DL-malate, diisoamyl-DL-malate, di-(2-methylbutyl)-DL-malate, dihexyl-DL-malate, di-(4-methyl-2-pentyl)-DL-malate and dibenzyl-DL-malate) is illustrated in Table 3. Assessment of biodegradability of these compounds was made using the Carbonaceous Biological Demand test at 5 days (CBOD5) and at 28 days (CBOD28). The test samples were weighed out and solubilized in Milli-Q water with a target total organic carbon (TOC) content of 100 mg/L. The chemical oxygen demand (COD) was measured on these solutions as a measure of the complete oxidation or Ultimate Biological Oxygen Demand (UBOD). These prepared samples were run in triplicate in 5 day and 28 day CBOD tests using a biomass seed from a Easton, Pa. Wastewater Treatment Plant which was not acclimatized to the compounds of this invention. Each measurement (5 day and 28 day CBOD) was run three times for each compound to confirm reproducibility. The results from the CBOD tests at 5 and 28 days were divided by the COD results for each respective solution and multiplied by 100 to calculate a percent biodegradation. A glucose/glutamic acid solution, which is readily biodegradable, was run as a positive control to check biomass health. This is the preferred control for BOD tests as listed in the Standard Methods. Examples which showed very low biodegradation which was below the limit of detection for the test (<24 mg/L or <8% biodegradation) are reported as 0% degraded in Table 3.

For compounds that are extremely biodegradable a high percent biodegradation is usually seen in the CBOD5 measurement, even when using unacclimatized biomass. Other compounds require a longer period of time during which the degrading organisms develop enzyme systems to utilize the test material as a food source. For these compounds, a higher oxygen demand is seen at 28 days. Compounds with high (i.e. greater than 60%) biodegradation after 28 days may be considered easily biodegraded.

The results of these studies showed that dibutyl-DL-malate, diisobutyl-DL-malate, dipentyl-DL-malate, diisoamyl-DL-malate, di-(2-methylbutyl)-DL-malate, dihexyl-DL-malate and dibenzyl-DL-malate all exhibit significant biodegradation after only 5 days in the CBOD5 test using unacclimatized biomass. Surprisingly, those dialkylmalates containing oxygen atoms attached at a terminal position demonstrated significantly more percent biodegradation than the corresponding malates containing an oxygen atom which was attached at an internal position on the alkyl group. For example, diisopropyl-(S)-(−)-malate, di-sec-butyl-DL-malate and di-(4-methyl-2-pentyl)-DL-malate were degraded only 0–3% after 5 days, whereas diisobutyl-DL-malate, diisoamyl-DL-malate and di-(2-methylbutyl)-DL-malate exhibited a significant amount of biodegradation after only 5 days (i.e. 13–39%).

After 28 days, all malates except the highly branched di(4-methyl-2-pentyl)malate degraded greater than 60%.

Due to the low level of measured biodegradation for di(4-methyl-2-pentyl)malate, this compound is not preferred relative to the more biodegradable malates of this invention. Overall, after 28 days malates with shorter alkyl chains degraded more than those with longer chains. This effect may be due to the decreasing solubility as the alkyl chain length increases. Of the longer chain malates (i.e. greater than C5), those with linear alkyl groups are more easily degraded. From these data, it can be concluded that all malate surfactants are easily biodegraded, with the exception of di(4-methyl-2-pentyl)malate. In addition, since all malates degraded to a significant extent in 28 days, these compounds are not expected to persist or bioaccumulate in the natural environment. Moreover, it should be emphasized that the tests used for the materials of this invention are very stringent biodegradation screening tests and higher degrees of biodegradation are likely for longer-term tests, tests using acclimatized biomass and under the conditions of a well-maintained wastewater treatment plant.

TABLE 3

Biodegradation

| | Structure | Trial | Percent Biodegradation at 5 days | Trial | Percent Biodegradation at 28 days |
|---|---|---|---|---|---|
| Example 31 (Example 1) | | 1 2 3 average | 2 0[a] 0[a] 1 | 4 5 6 average | 100 100 100 100 |
| Example 32 (Example 2) | | 1 2 3 average | 38 35 32 35 | 4 5 6 average | 100 100 100 100 100 |
| Example 33 (Example 3) | | 1 2 3 average | 16 13 14 14 | 4 5 6 average | 100 100 100 100 |
| Example 34 (Example 4) | | 1 2 3 average | 0[a] 3 0[a] 1 | 4 5 6 average | 79 100 100 93 |
| Example 35 (Example 5) | | 1 2 3 average | 53 47 47 49 | 4 5 6 average | 91 88 83 87 |

TABLE 3-continued

Biodegradation

| | Structure | Trial | Percent Biodegradation at 5 days | Trial | Percent Biodegradation at 28 days |
|---|---|---|---|---|---|
| Example 36 (Example 6) | [structure] | 1<br>2<br>3<br>average | 31<br>37<br>39<br>35 | 4<br>5<br>6<br>average | 100<br>76<br>54<br>77 |
| Example 37 (Example 7) | [structure] | 1<br>2<br>3<br>average | 26<br>30<br>30<br>29 | 4<br>5<br>6<br>average | 88<br>85<br>86<br>86 |
| Example 38 (Example 8) | [structure] | 1<br>2<br>3<br>average | 61<br>46<br>47<br>51 | 4<br>5<br>6<br>average | 88<br>95<br>100<br>94 |
| Example 39 (Example 9) | [structure] | 1<br>2<br>3<br>average | 2<br>2<br>0[a]<br>2 | 4<br>5<br>6<br>average | 29<br>29<br>59<br>39 |
| Example 40 (Example 10) | [structure] | 1<br>2<br>3<br>average | 44<br>—<br>—<br>44 | 4<br>5<br>6<br>average | 79<br>91<br>96<br>89 |
| Example 41 | glucose/glutamic acid control | 1<br>2<br>3<br>average | 71<br>65<br>67<br>68 | 4<br>5<br>6<br>average | 94<br>94<br>100<br>96 |

[a]Biodegradation that was below the detection limit of the test (<24 mg/L or <8% biodegradation)

The ability of a surfactant in aqueous systems to reduce surface tension under both equilibrium and dynamic conditions is of great importance in the performance of water-based coatings, inks, adhesives, fountain solutions and agricultural compositions. Low equilibrium surface tension allows the development of excellent properties subsequent to application. Low dynamic surface tension results in enhanced wetting and spreading under the dynamic conditions of application, resulting in more efficient use of the formulations and fewer defects. In waterborne coatings, inks, adhesives, fountain solutions and agricultural compositions, the formation of foam is generally undesirable because it complicates handling and can cause defects or result in inefficient application. Furthermore, there is substantial interest in the industry in the development of environmentally-friendly surfactants. As a result, it is essential to the invention described herein is that this new family of surfactants not only possess the aforementioned desired performance attributes but also is derived from naturally occurring compounds or their synthetic equivalents and possess favorable environmental characteristics, such as facile biodegradation. Moreover, it is desired that this novel family of surfactants which exhibit good equilibrium and dynamic surface tension properties, are low-foaming, are also low viscosity liquids to facilitate handling, and have low color and low odor characteristics.

Although dialkylmalates have been studied in numerous applications, their role appears to have not been to as surfactants themselves. In particular, surfactancy by relatively short chain dialkylmalates is not apparent from the prior art. In fact, there are not many examples of short-chain dialkylmalates in aqueous media. A property which is particularly not apparent from the prior art is the outstanding dynamic properties shown by dialkylmalates in reducing the surface tension of aqueous mixtures under conditions of high surface creation rates and that this performance would be particularly good for malic acid esters containing C3 to C5 alkyl groups and especially good for malic acid esters containing C4 alkyl groups. Moreover, it is not expected from the prior art that terminal branching in the alkyl groups would increase both the efficiency and effectiveness of the surfactant and that dialkylmalates prepared from primary alcohols would perform better than those prepared from secondary alcohols, with isobutyl alkyl groups resulting the optimum combination of such properties.

In order to obtain satisfactory performance under high speed application conditions, surfactants that exhibit both reduction in surface tension under dynamic conditions and low foam are essential. Unexpectedly, these malic acid ester surfactants are low foaming. In addition, many of these dialkylmalates biodegrade easily. This property, in combination with unique dynamic surface tension reducing capabilities, low foam and desirable physical characteristics, such as low color, low odor and low viscosity, afford a novel class of surfactants which are particularly suited for a variety of waterborne compositions including coatings, inks, adhesives, fountain solutions and agricultural compositions.

STATEMENT OF INDUSTRIAL APPLICATION

The invention provides compositions suitable for reducing the equilibrium and dynamic surface tension in water-based coating, ink, adhesive, fountain solution and agricultural compositions.

We claim:

1. In a method for applying a coating of a water-based composition to a surface to partially or fully coat the surface, the composition comprising an aqueous medium which is at least 90 wt % water and containing an inorganic or organic compound and an effective amount of a surfactant for reducing the dynamic surface tension of the composition, the improvement which comprises employing as the sufactant a malate diester of the structure

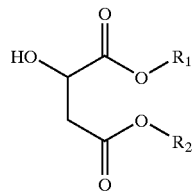

where $R_1$ and $R_2$ are C3 to C6 alkyl groups.

2. The method or claim 1 in which the water-based composition is selected from the group consisting of aqueous organic coating, ink, adhesive, fountain solution and agricultural compositions and the malate diester is present at 0.001 to 20 wt % of the water-based composition.

3. The method of claim 2 in which an aqueous sotutlen of the instate diester demonstrates a dynamic surface tension of less than 45 dynes/cm at a concentration of ≦5 wt % in water at 25° C. and 6 bubbles/second according to the maximum-bubble-pressure method.

4. The method of claim 1 in which $R_1$ and $R_2$ are the same.

5. The method of claim 4 in which $R_1$ and $R_2$ are a C4 alkyl group.

6. The method of claim 4 in which $R_1$ and $R_2$ are a C5 alkyl group.

7. The method of claim 4 in which the alkyl group has terminal branching.

8. The method of claim 4 in which the alkyl group is isobutyl.

9. The method of claim 4 in which the alkyl group is n-butyl.

10. The method of claim 7 in which the ester is derived from a primary alcohol.

11. The method of claim 3 in which the measurement is made at 20 bubbles/second.

12. An aqueous composition comprising in an aqueous medium which is at least 90 wt % water an inorganic compound which is a mineral ore or a pigment or an organic compound which is a pigment, a polymerizable monomer, an of igometic resin, a polymeric resin, a detergent, a herbicide, an insecticide, a fungicide, or a plant growth modifying agent and an effective amount of a malate diestor for reducing the dynamic surface tension of the composition, the malato diester having the structure:

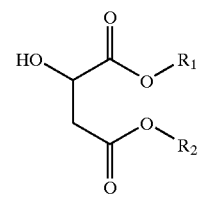

where $R_1$ and $R_2$ are a C3 to C6 alkyl group.

13. The aqueous composition of claim 12 in which an aqueous solution of the malate diester demonstrates a dynamic surface tension of less than 45 dynes/cm at a concentration of ≦5 wt % in water at 25° C. and 6 bubbles/second according to the maximum-bubble-pressure method and the malate diester is present at 0.01 to 10 wt % of the aqueous composition.

14. The aqueous composition of claim 12 in which $R_1$ and $R_2$ are a C4 alkyl group.

15. The aqueous composition of claim 12 in which $R_1$ and $R_2$ are a C5 alkyl group.

16. The aqueous composition of claim 12 in which the alkyl group has terminal branching.

17. The aqueous composition of claim 16 in which the ester is derived from a primary alcohol.

18. The aqueous composition of claim 12 in which the alkyl group is isobutyl.

19. The aqueous composition of claim 12 in which the alkyl group is n-butyl.

20. The aqueous composition of claim 13 in which the measurement is made at 20 bubbles/second.

* * * * *

UNITED STATES PATENT AND TRADEMARK OFFICE
CERTIFICATE OF CORRECTION

PATENT NO. : 6,969,738 B2
DATED : November 29, 2005
INVENTOR(S) : Kevin Rodney Lassila et al.

It is certified that error appears in the above-identified patent and that said Letters Patent is hereby corrected as shown below:

Column 26,
Line 1, delete "sotutlen" and replace with -- solution --.
Line 2, delete "instate" and replace -- malate --.
Line 25, delete "of lgometic" and replace with -- oligomeric --.
Line 27, delete "diestor" and replace with -- diester --.
Line 29, delete "malato" and replace with -- malate --.

Signed and Sealed this

Twenty-fourth Day of January, 2006

JON W. DUDAS
*Director of the United States Patent and Trademark Office*